June 18, 1968
A. S. HART
FLAME-RESPONSIVE CONTROL CIRCUIT USING RADIATION SENSITIVE MEANS
Filed June 30, 1964
3,389,261
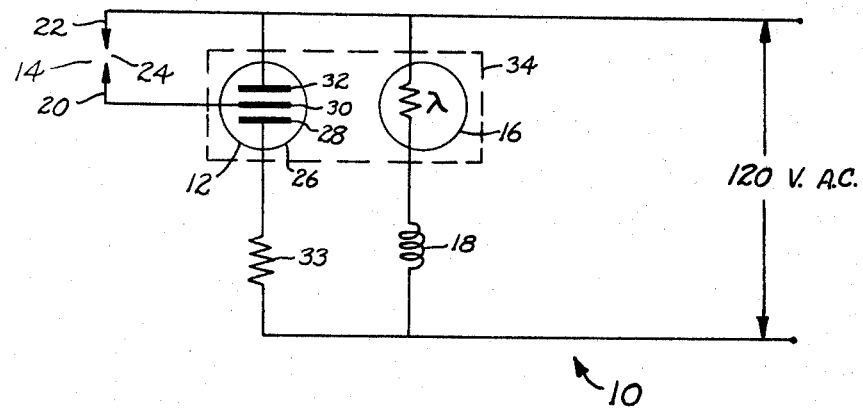
INVENTOR.
ATLEE S. HART
BY
JOHN E. McRAE 3,389,261
FLAME-RESPONSIVE CONTROL CIRCUIT USING
RADIATION SENSITIVE MEANS
Atlee S. Hart, Oak Park, Mich., assignor to American
Standard Inc., a corporation of Delaware
Filed June 30, 1964, Ser. No. 379,309
1 Claim. (Cl. 250—206)

ABSTRACT OF THE DISCLOSURE

A three electrode glow lamp has a trigger electrode connected to one of a pair of electrodes placed in a flame. The lamp is enclosed in a light-impervious enclosure along with a photocell which comprises part of a control circuit.

---

This invention relates to an electrical circuit for controlling an electric load device in response to the presence or absence of a gas flame. It is useful for example as a safety circuit for electrically interrupting the supply of gas to a burner in the event of flame failure.

One object of the invention is to provide a flame-responsive control circuit which responds substantially instantaneously to the presence or absence of flame, thereby enabling it to be used with burners where large quantities of dangerous unburned gas can accumulate in short time periods.

Another object is to provide a flame-responsive control circuit which is devoid of exposed make-break electrical contacts subject to malfunction due to contamination.

A further object is to provide a flame-responsive control circuit which can be built to include small size component parts, thereby permitting use of the circuit where space is at a premium.

A still further object is to provide a flame-responsive control circuit which has a relatively low manufacturing cost and a relatively long service life.

Other objects of this invention will appear from the following description, accompanying drawing, and appended claims.

In the drawing the single figure is a diagram of a control circuit embodying the invention.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

As illustrated in the drawing the invention may be embodied in an electrical control circuit 10 which includes a three electrode glow lamp 12, a flame-responsive device 14 for energizing the lamp, a photoconductive cell 16 for receiving light rays emitted by lamp 12, and a load or load-switching device 18 controlled by cell 16.

Flame responsive device 14 includes two fire-resistant spaced electrodes 20 and 22 disposed directly in a burner flame area so that the flame plays on the gap 24. In practice the gap may be on the order of one-half inch or thereabouts, although there appears to be nothing critical in the distance; smaller or larger gaps may be employed. The burner flame may be a small flame, as for example a pilot in a domestic gas-fired clothes dryer, or a larger flame as for example the main burner in a domestic or industrial furnace.

Device 14 is believed to operate on an ionization principle wherein the burner flame substantially instantaneously ionizes the gas in gap 24 such as to permit current flow across electrodes 20 and 22. Flame failure results in substantially instantaneous disruption of the current flow. The current is small and cannot be used directly in a load circuit; hence I employ device 14 in conjunction with the other control components 12 and 16 to provide a usable circuit.

Glow lamp 12 preferably takes the form of a miniature three electrode lamp marketed by General Electric Company under its designation NE–77. Signalite, Inc. of Neptune, N.J., also markets a suitable lamp. The lamp comprises a transparent glass enclosure 26 and three electrodes 28, 30 and 32 hermetically sealed therein. The enclosure is charged with neon or other ionizable gas such that a triggering voltage applied to center electrode 30 is effective to ionize the gas. The ionized gas is then effective to conduct current across the light-emitting electrodes 28 and 32.

The potential across the load electrodes 28 and 32 must be maintained above a certain value to sustain ionization. In an A.C. circuit the A.C. voltage drops below such value twice per applied cycle, but if the trigger electrode is in an energized condition the lamp will reignite without any visible loss of illumination. When flame responsive device 14 becomes non-conducting the gas will deionize and thus the lamp will darken near the completion of the prevailing applied half cycle. To limit the current and preserve the lamp life it is necessary to provide a resistance 33 in series with the load electrodes.

Lamp 12 produces a very low level of illumination. The lamp and photoconductive cell 16 are therefore preferably enclosed in a light-impervious enclosure 34 which in practice may be about match-box size. The illumination produced by lamp 12 thus energizes cell 16 irrespective of ambient light conditions outside the enclosure. As shown in the drawing the cell is in series with a load 18 which in practice may be the coil of a relay used to control the electric valve in the gas supply for the burner flame playing on switch 14. The circuit may thus be used as a flame-responsive control circuit in a gas burner environment.

The time response of the circuit to flame-failure and flame-ignition is very short, when using conventional 120 V.A.C. Lamp 12 and cell 16 may in practice be positioned remote from device 14, as for example adjacent the control valve for the burner gas supply. Other control circuitry such as a room thermostat, stack control, and electric igniter can be employed in conjunction with the illustrated circuitry.

What is claimed:
1. Flame-responsive circuitry comprising a pair of terminals constituting a voltage source; a three electrode glow lamp having two electrodes connected in an electrical circuit between the aforementioned terminals, said lamp having a third trigger electrode, and said lamp being charged with an ionizable gas so that application of a trigger voltage to the third electrode causes a current to flow across the space between the first two electrodes; a pair of spaced flame electrodes disposed in a flame area and operable to conduct current only when the space therebetween is subjected to a flame; a first circuit line connecting one of the flame electrodes with one of the source terminals; a second circuit line connecting the other flame electrode with the aforementioned trigger electrode whereby establishment of a flame produces a glowing condition at the lamp; a current-limiting resistance in said electrical circuit for causing the glowing condition to be of low order brilliance; a control circuit comprising a photoconductive cell and a relay in series with one another and in circuit with said terminals; and a light-sealed enclosure enveloping the glow lamp and photoconductive cell, whereby a glowing condition at the lamp produces a current flow in said control circuit.

References Cited
UNITED STATES PATENTS

| | | | |
|---|---|---|---|
| 2,003,624 | 6/1935 | Bower | 340—228.1 X |
| 2,352,240 | 6/1944 | Wolfner | 340—228.1 X |
| 2,705,296 | 3/1955 | Weber | 340—228.1 X |
| 3,192,387 | 6/1965 | Goodman | 250—206 X |
| 3,314,058 | 4/1967 | Osborne | 340—228 |

WALTER STOLWEIN, *Primary Examiner.*